(12) United States Patent
Pinney et al.

(10) Patent No.: US 9,670,650 B2
(45) Date of Patent: Jun. 6, 2017

(54) FIRE HYDRANT MONITORING SYSTEM

(71) Applicant: Sensus Spectrum LLC, Raleigh, NC (US)

(72) Inventors: Daniel Pinney, Raleigh, NC (US); Thomas Williams, Hope Valley, RI (US); Robert Haines, Boise, ID (US); Travis Smith, Raleigh, NC (US); Ryan Roberts, Raleigh, NC (US)

(73) Assignee: Sensus Spectrum LLC, Raleigh, NC (US)

( * ) Notice: Subject to any disclaimer, the term of this patent is extended or adjusted under 35 U.S.C. 154(b) by 0 days.

(21) Appl. No.: 14/935,816

(22) Filed: Nov. 9, 2015

(65) Prior Publication Data
US 2017/0130431 A1 May 11, 2017

(51) Int. Cl.
*G08B 21/00* (2006.01)
*E03B 7/07* (2006.01)
*E03B 9/02* (2006.01)
*G01M 3/24* (2006.01)

(52) U.S. Cl.
CPC ............ *E03B 7/072* (2013.01); *E03B 9/02* (2013.01); *G01M 3/243* (2013.01)

(58) Field of Classification Search
CPC ............ E03B 9/02; E03B 7/003; E03B 7/072; G01M 3/243; G01M 3/00; G01F 15/063
USPC ............................................. 340/605; 702/45
See application file for complete search history.

(56) References Cited

U.S. PATENT DOCUMENTS

| | | | |
|---|---|---|---|
| 6,453,247 B1* | 9/2002 | Hunaidi | G01M 3/243 702/51 |
| 7,099,781 B1* | 8/2006 | Heidl | G01F 1/075 702/45 |
| 7,328,618 B2* | 2/2008 | Hunaidi | G01B 17/02 73/597 |
| 7,373,261 B2* | 5/2008 | Heidl | G01F 1/075 702/45 |
| 7,980,317 B1 | 7/2011 | Preta et al. | |
| 8,362,919 B2* | 1/2013 | Cooper | H04B 13/00 205/779 |
| 8,614,745 B1 | 12/2013 | Azemi | |
| 9,287,963 B2* | 3/2016 | Parish | H04B 7/14 |
| 9,291,520 B2* | 3/2016 | Fleury, Jr. | G01M 3/00 |
| 2008/0189056 A1* | 8/2008 | Heidl | G01F 15/063 702/45 |
| 2012/0004866 A1 | 1/2012 | Plouffe et al. | |
| 2012/0007744 A1* | 1/2012 | Pal | G01M 3/243 340/605 |
| 2013/0145826 A1 | 6/2013 | Richarz et al. | |

\* cited by examiner

*Primary Examiner* — John A Tweel, Jr.
(74) *Attorney, Agent, or Firm* — Andrus Intellectual Property Law, LLP

(57) ABSTRACT

A fire hydrant water leak and theft detection system is connected to a dry barrel fire hydrant. The detector is connected to the upper barrel portion of the fire hydrant below the nozzle assembly and includes a pair of electrodes. A signal is generated when water in the upper barrel portion closes an electrical circuit between the two electrodes due to the conductivity of the water between the electrodes. The detection system sends a signal to a network system upon detection of water in the barrel portion and relays to remote monitoring locations.

20 Claims, 4 Drawing Sheets

FIRE HYDRANT MONITORING SYSTEM

BACKGROUND

The present disclosure generally relates to a device and method for monitoring the water level in a fire hydrant. More specifically, the present disclosure relates to a detector connected to a fire hydrant that communicates signals indicative of water present in the fire hydrant, as well as the status of the detector, to a central computing/network system.

Presently, several devices are available in the commercial marketplace for determining whether or not water is being discharged from the hydrant due to theft, leaks, and/or removal of the hydrant itself. Present detectors sense the presence of water by detecting flow across sensors, voltage drop across sensors, and the like. Additionally, present detectors are not remotely monitored.

SUMMARY

The present disclosure relates to a detector that senses the presence of water in a fire hydrant barrel. The detector includes a communication device to send a radio, cellular or other wireless signal to a central computing/network system or signal collection station.

The detector includes a pair of electrodes that form a portion of an open electrical circuit. During a low water level event, the electrical circuit remains open and no signal is produced by the detector. In contrast, at a high water mark, water closes the electrical circuit and allows electrical current to flow from one electrode to another causing a controller to produce a signal.

The conductivity of the water is linked to the total dissolved solids in the water. The water in a fire hydrant barrel contains a percentage of total dissolved solids that allows the current to flow through the water. The inventors of the present invention has recognized that using these inherent conductive properties of the water flowing through the barrel is a reliable and inexpensive way to determine if water is present at the location when the detector is installed on the barrel.

In some examples, a fire hydrant monitoring system for a fire hydrant includes a housing and an inlet. The housing is connected to the exterior surface of the barrel. The system also includes a controller and a pair of electrodes. The controller is located in the housing and the pair of electrodes are connected to the controller. The controller and the electrodes form an open circuit. When water enters the housing and flows between the electrodes, the open circuit is closed and the controller processes a signal.

In other examples, a detector for monitoring the presence of water in a fire hydrant includes a housing, an inlet, and a sensing chamber. The housing is connected to the fire hydrant, and the inlet is connected to the sensing chamber. The detector also includes a pair of electrodes, a sensor interface, a processing device, a communication device, an antenna controller, and an antenna. Each electrode includes a first end and second end. The first ends positioned in the sensing chamber and the second ends connected to the sensor interface. The sensor interface and electrodes form an open circuit. The sensor interface is connected to the processing device. When water is located between the two electrodes the open circuit is closed and the processing device processes a signal. The processing device is connected to the communication device, the antenna controller, and antenna which transmits the signal.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings.

DETAILED DESCRIPTION

Figures 1, 2:
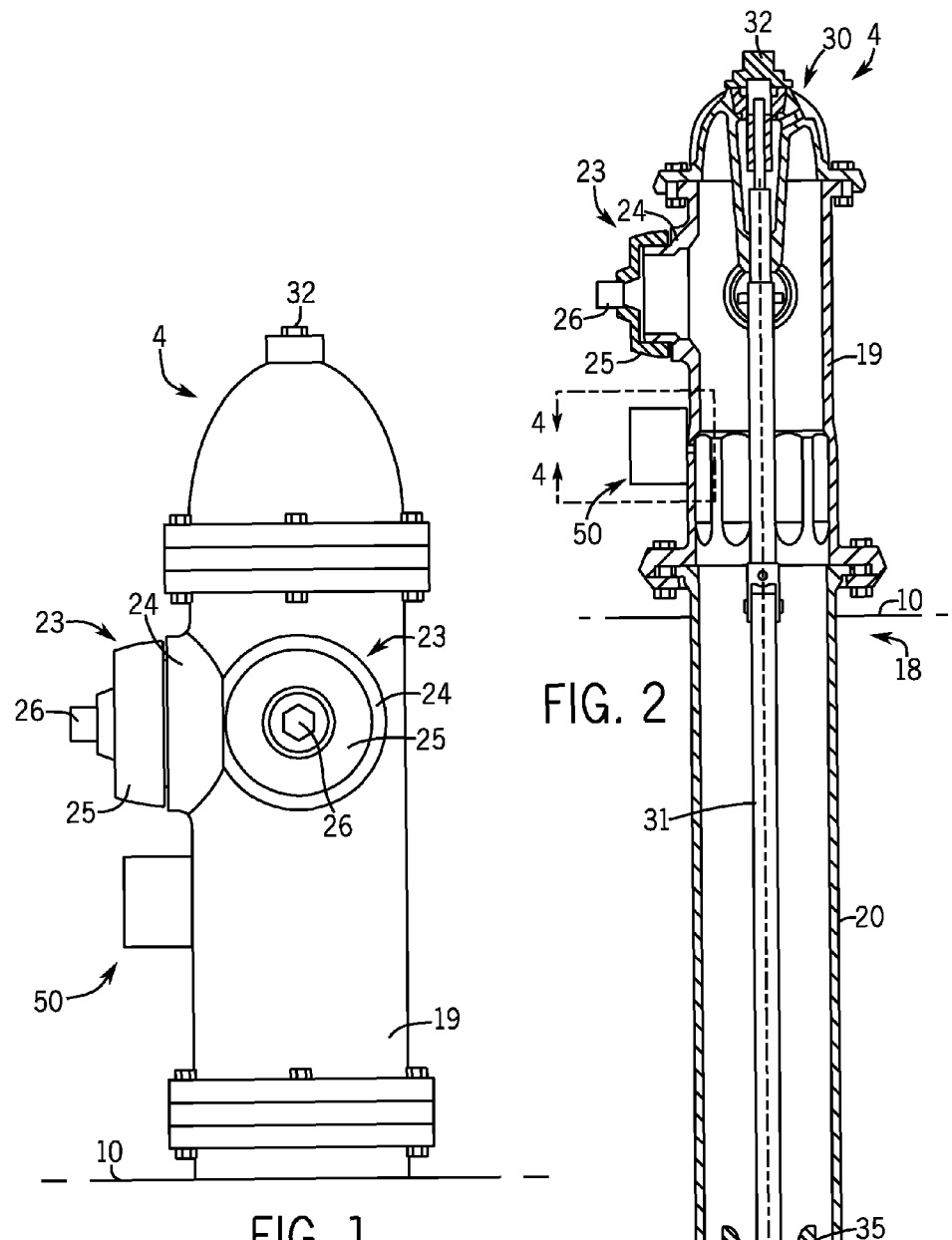
FIG. 1 is a side view a fire hydrant above grade including the water detector device of the present disclosure.
FIG. 2 is a cross sectional view of the fire hydrant of FIG. 1 and includes portions of the fire hydrant that are below grade.

FIGS. 1-2 illustrate a fire hydrant water detector 50 in accordance with the present disclosure. The detector 50 is shown connected to a fire hydrant 4. In one example, the detector 50 is connected to a conventional dry barrel fire hydrant 4 which includes a barrel 18 connected to the water main 14 by a pipe fitting 12, such as a tee or elbow. In most applications, the water main 14 is buried below grade 10. The barrel 18 is substantially perpendicular to the water main 14 and rises upwardly from the pipe fitting 12.

Referring to FIG. 2, the fire hydrant 4 includes a valve assembly 35, an operating mechanism 30, and a nozzle assembly 23.

The barrel 18 includes an upper barrel 19 and a lower barrel 20. The lower barrel 20 is connected to the upper barrel 19, and the upper barrel 19 extends above grade 10 such that a portion of the fire hydrant 4 is accessible to fire departments and/or utilities. The operating mechanism 30 and a nozzle assembly 23 are connected to the upper barrel 19.

The nozzle assembly 23 includes at least one nozzle outlet 24, which extends substantially lateral from the upper barrel 19. A nozzle cap 25 is removably connected to the nozzle outlet 24 and prevents water from flowing out of the fire hydrant 4 and/or prevents contaminates from entering the upper barrel 19. The nozzle outlet 24 includes threads that allow fire fighting hoses or other apparatus to be removably connected to the nozzle outlet 24.

The operating mechanism 30 is connected to the valve assembly 35 by an operating rod 31. The operating rod 31 is an elongated shaft (one or two piece) extending through the lower barrel 20 and upper barrel 19. In one example, the operating mechanism 30 includes an operating nut 32 that is accessible from the top of the upper barrel 19. The size and shape of the operating nut 32 is the same as the nozzle nut 26 on the nozzle cap 25. In operation, the operating nut 32 is rotated counterclockwise by an operator causing the operating rod 31 to also rotate in a counterclockwise direction. Under the rotation, the valve assembly 35 moves between a closed position (FIG. 3A) to a partially open position (FIG. 3B) and further to a fully open position (FIG. 3C). Alternatively, if the operating nut 32 is rotated in a clockwise direction, the valve assembly 35 moves in the opposite direction from the fully open position (FIG. 3C) to a closing position (FIG. 3D) and further to a closed position (FIG. 3A).

Figures 3A, 3B:
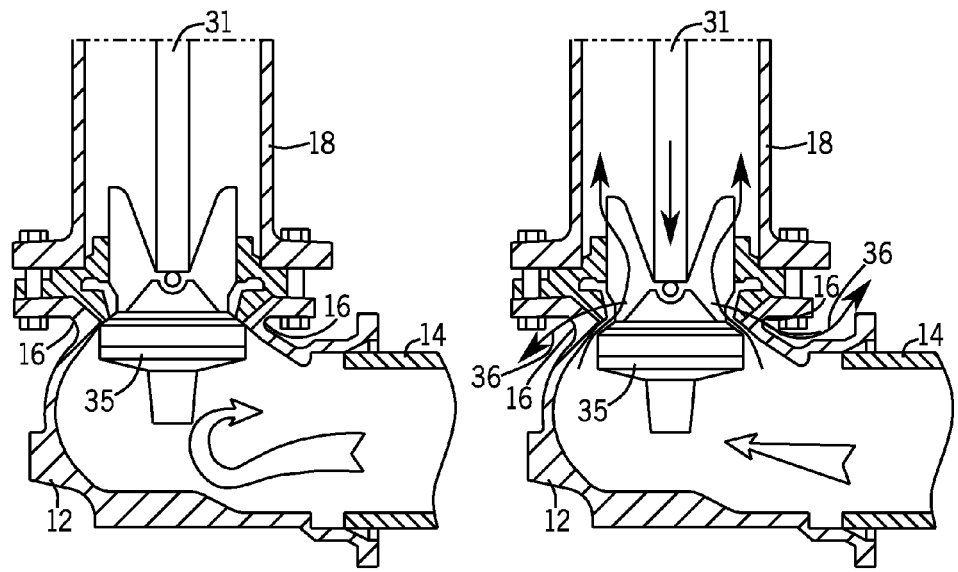
FIGS. 3A-3D are enlarged section views of the valve assembly of the fire hydrant in the present disclosure.
Figures 3C, 3D:
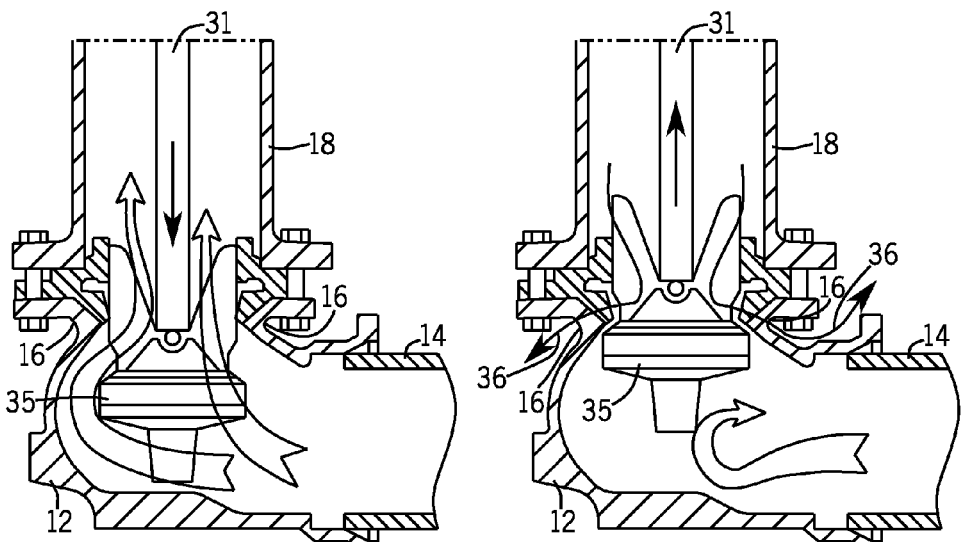

Referring to FIG. 3A-3D, the valve assembly 35 controls the flow of water moving into the barrel 18. The valve assembly 35 includes a series of plates, seats, flanges, gaskets, and other elements. As depicted in FIG. 3A, the valve assembly 35 is in a fully closed position. In this closed position, pressurized water from the water main 14 does not enter the barrel 18. Turning to FIG. 3B, as the operating rod 31 rotates counterclockwise, the valve assembly 35 is depicted in a partially open position. In the partially open position, a space between the valve assembly 35 and the pipe fitting 12 allows water to enter the barrel 18. As water continues to enter the barrel 18, the water level in the barrel moves upward through the lower barrel 20 and into the upper barrel 19. With further rotation of the operating rod 31, the valve assembly 35 moves to the fully open position, as depicted in FIG. 3C. Once the water level reaches an open nozzle outlet 24, the water may exit the barrel 18.

To close the valve assembly 35 and prevent water from flowing out of the nozzle outlet 24, the operator applies a clockwise rotation to the operating nut 22. Under this rotation, the valve assembly 35 moves to the closing position, as depicted FIG. 3D. Further clockwise rotation moves the valve assembly 35 back to a fully closed position, as depicted in FIG. 3A. Once closed, any water remaining in the barrel 18 below the level of the open nozzle outlet drains from the barrel 18 through weep holes or drain valves 16 located at the bottom of lower barrel 20, as shown by arrow 36 in FIGS. 3B and 3D. In some examples, the drain valves 16 may be connected to the pipe fitting 12.

If the weep holes or drain valves 16 become clogged with debris or any other foreign matter, the water in the barrel 18 will not properly drain. In climates where the temperature drops below freezing, if the water does not properly drain and freezes, the expansion of the frozen water can create problems and damage the operating components of the fire hydrant.

Figure 4:
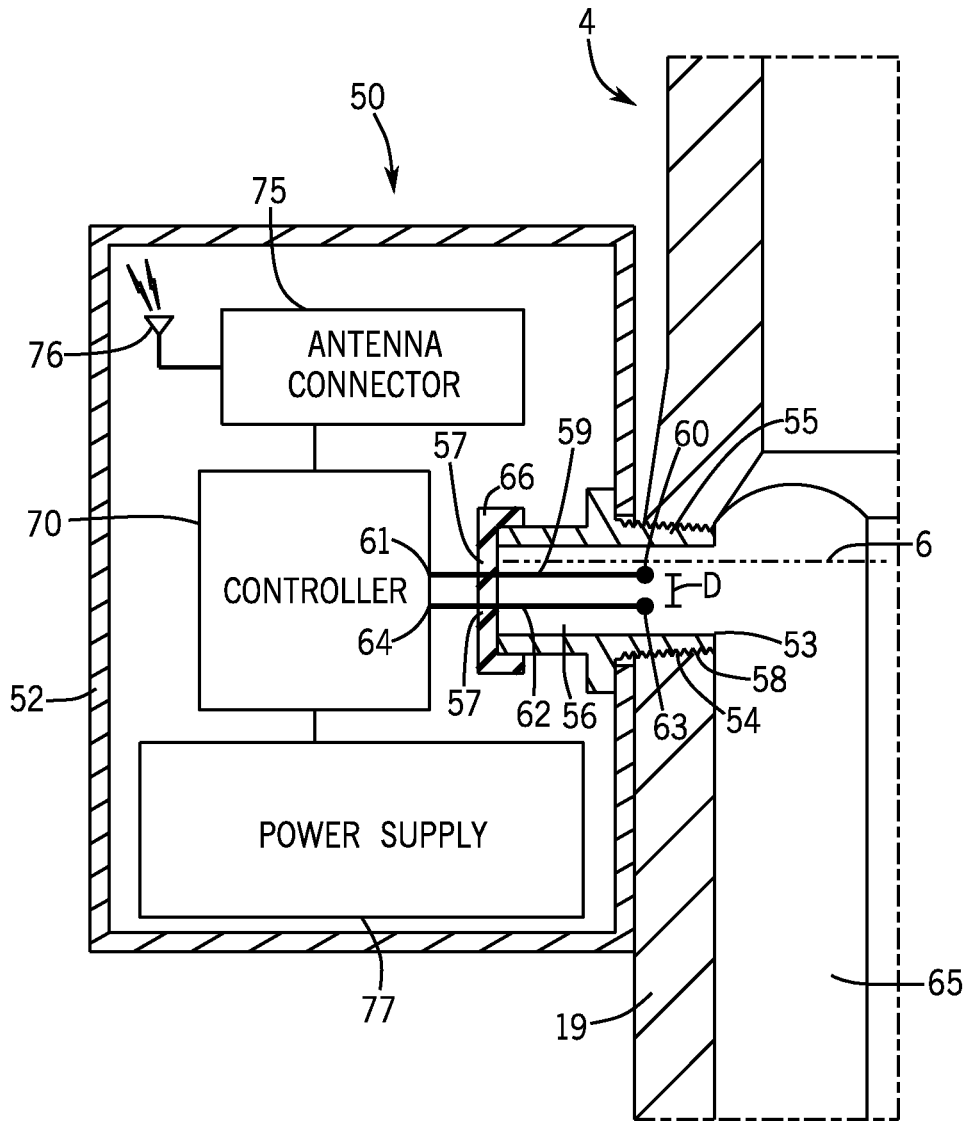
FIG. 4 is an enlarged section view of the device of the present disclosure.

Now referring to FIG. 4, an enlarged view of the detector 50 is depicted. The detector 50 is connected to the upper barrel 19. In one example, the detector 50 is connected to the upper barrel 19 below the nozzle assembly 23, as shown in FIG. 1. The detector 50 includes a housing 52 and an inlet fitting 53. In one example, the inlet fitting 53 is generally cylindrical and includes screw threads 54 on an attachment portion 55 and drain surfaces (not shown). In operation, the inlet fitting 53 is connected to the upper barrel 19 at a threaded receiver hole 58 in the upper barrel 19. However, one of ordinary skill in the art will recognize that the inlet fitting 53 may be connected to the upper barrel 19 in any suitable way including screw threads, adhesives, snap fittings, and the like. In other examples the detector 50 may be connected to the nozzle outlet 24. It will also be recognized that additional components, such as gaskets, fittings, and the like, may be used to connect the detector 50 to the barrel 18. When connected to the upper barrel 19, the housing 52 is adjacent to or in contact with the outer surface of the upper barrel 19. Gaskets and/or O-rings may be included between the inlet fitting 53 and the upper barrel 19 to create a fluid tight seal.

The drain surfaces of the inlet fitting 53 may be connected to the inlet fitting 53 and/or the housing 52. In some examples, the drain surfaces are integral with the housing 52. The inlet fitting 53 includes an open sensing chamber 56. The sensing chamber 56 is an open space defined by the outer wall of the inlet fitting 53 and is open to the open interior 65 of the upper barrel 19. The sensing chamber 56 is independent and sealed from the other portions of the detector 50 to prevent water damage to other components.

When the detector 50 is in operation and connected to the barrel 18, as described above, the detector 50 determines whether or not water is present in the barrel 18 at the elevation where the detector 50 is installed. Water may sensed by the detector 50 when the hydrant 4 is being operated by an authorized or unauthorized user, when water is being stolen from the hydrant 4, when there is a leak in the valve assembly 35 that causes water to continuously fill the barrel 18, and/or when the drain valves 16 are blocked.

Water in the barrel 18 flows into the sensing chamber 56 of the inlet fitting 53 of the detector 50. The inlet fitting 53 includes a cap 66 that includes at least one sensing hole 57 to provide access to the sensing chamber 56. The sensing holes 57 may be sealed with a gasket, glue, caulk, O-rings, and the like to prevent water from moving into other portions of the housing 52. The sensing holes 57 allow at least one electrode 59, 62 to extend into the sensing chamber 56, and each electrode 59, 62 includes a first end 60, 63 and a second end 61, 64. The first ends 60, 63 of the electrodes 59, 62 protrude through the sensing holes 57 and are positioned in the sensing chamber 56. The second ends 61, 64 of the electrodes 59, 62 are connected to a controller 70, to be discussed further herein. The first ends 60, 63 of the electrodes 59, 62 are separated by a distance D such that the controller 70 and electrodes 59, 62 form an open electrical circuit.

As mentioned above, the electrodes 59, 62 are positioned in the sensing chamber 56 such that they from an open electrical circuit with the controller 70. However, when water is present between the electrodes 59, 62, such as when the water level reaches a high water mark 6, the electrical circuit is closed and an electrical current can flow through the water due to the electrical conductivity of the water. When the circuit is closed, the controller 70 is placed into an alert mode and is capable of producing a water-present signal. When the circuit is open, the controller 70 may remain in a sleep mode and produces a no-water-present signal or no signal at all. It will be recognized that the high water mark 6 may be any water level that allows water to flow between the two electrodes 59, 62.

Figure 5:
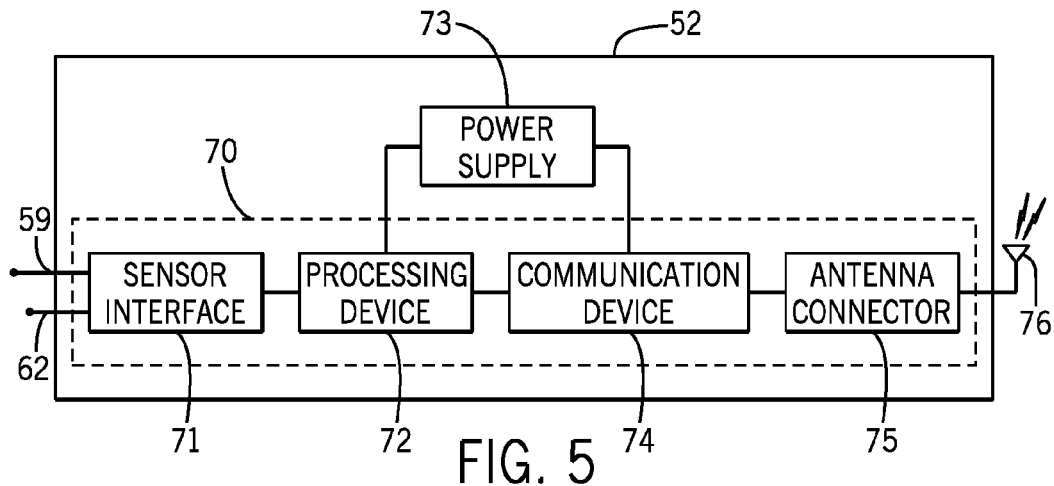
FIG. 5 is a block diagram illustrating the device circuitry.

Now referring to FIG. 5, the controller portion of the detector is depicted in greater detail. As mentioned above, the second ends 61, 64 of the electrodes 59, 62 are connected to a controller 70 located inside the housing 52. The controller 70 includes a sensor interface 71, a processing device 72, power supply 73, and a communication device 74. In some examples the controller 70 may also include an antenna connector 75 and an antenna 76. The processing device 72 controls the sensor interface 71 and the communication device 74. The processing device 72 may continually or periodically monitor the status of the sensor interface 71.

In some examples, the second ends 61, 64 of the electrodes 59, 62 are connected to the sensor interface 71. When water between the electrodes 59, 62 forms a closed circuit, the processing device 72 will generate an alarm or warning signal to the communication device 74, to be described further herein. The processing device 72 may also aggregate and store multiple alarm or warning signals from the sensor interface 71 on a memory (not shown). For instance, the processing device 72 may monitor the status of the sensor interface 71 for several hours before relaying signal data to the communication device 74. In this example, each water-present signal or no-water-present signal is held in the memory with an appropriate time stamp until the processing device 72 is scheduled to relay the signal data to the communication device 74. The aggregation of data and sending periodic signal data helps to minimize power consumption. It is also contemplated that the processing device 72 may encrypt and/or transform signal data from the sensor interface and/or data from the communication device 74 into different data formats.

Since the processing device 72 will generate an alarm or warning signal every time water is present between the pair of electrodes 59, 62, such signal will also be generated during authorized testing of the fire hydrant. In order to prevent alarm signals from being generated during authorized testing, the detector 50 can be configured to include some type of override device. Such an override device may include a unique password or code that is entered into the controller 70 using a user interface (not shown) on the housing 52 or some type of wireless communication. When authorized personnel, such as a fire department or utility, wishes to test the hydrant, the authorized personnel can enter the unique code or override signal to temporarily suspend generation of the alarm or warning signal from the controller 70. During the authorized testing, water present between the pair of electrodes 59, 62 would not generate an alert or alarm condition, which would avoid nuisance alarms being received at the utility. Once the authorized testing is complete, the override would be disabled and the detector 50 would continue operating in a normal manner.

The communication device 74 is connected to an antenna connector 75 and an antenna 76. The communication device 74 processes the data from the processing device 72 and transmits the data via the antenna connector 75 and the antenna 76. The communication device 74 may use various types of communication networks and protocols, such as FlexNet®, Wi-Fi, low-energy Bluetooth®, and the like. The communication device 74 may communicate with a router, a modem, handheld remote receiver unit, and/or cloud services for retrieval and analysis including internet accessibility. One of ordinary skill in the art may also recognize that the communication device 74 may be a wired connection. The communication device 74 may also act as a transceiver, and thus receive data from external sources. The antenna 76 is connected to the antenna connector 75, and the antenna 76 may be positioned inside the housing 52, attached to the outside the housing 52, or partially inside the housing 52. It is also contemplated that an intermediate base station may be provided between the detector 50 and the utility. The base station may collect signals from multiple detectors 50 before communicating the signals to the utility via the internet.

The power supply 73 is connected to the processing device 72 and the communication device 74. It should also be known to those having ordinary skill in the art that the power supply 73 may provide power to other components of the detector 50. It is also contemplated that the power supply 73 may be any type of power component such as a battery, rechargeable battery, and the like. It is further contemplated that the power supply 73 may include thermal couples, photovoltaic cells, vibration kinetic motion converters, and the like. The power supply 73 may also be a wired connection via AC source, DC source, Ethernet connection, and the like. In one example, the power supply 73 in a battery that contains enough electrical power to power the detector 50 for at least ten years under normal operation.

Figure 6:
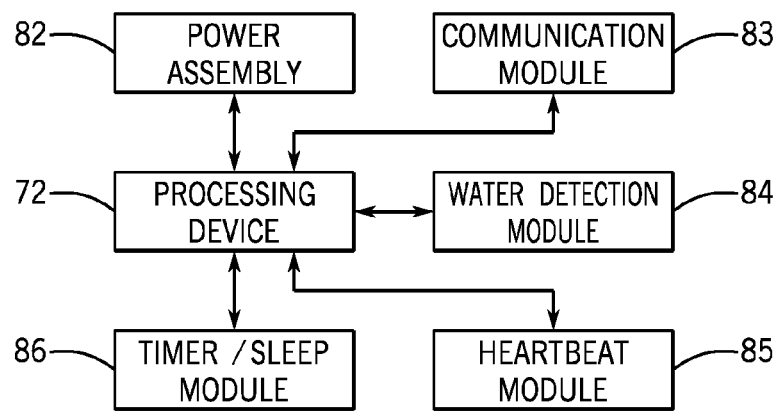
FIG. 6 is a block diagram illustrating the processing device shown in FIG. 6 of the present disclosure.

Turning now to FIG. 6, a block diagram showing an example of the processing device 72 is shown. The processing device 72 depicted in FIG. 6 may include the devices and interfaces discussed above as well as a power assembly 82, a communication module 83, a water detection module 84, a heartbeat module 85, and a timer/sleep module 86.

The power assembly 82 may be connected to the power supply 73, and the power assembly 82 may control the voltage and current levels provided to the processing device 72 and/or the communication device 74. The communication module 83 connects to the communication device 74 and receives and/or sends signals for communication through the communication device 74. The water detection module 84 may be configured to analyze the status of the circuit formed by electrodes 59, 62 and the sensor interface 71, as described above. Besides the presence of water between the electrodes 59, 62 to complete the circuit and detect the presence of water, the water detection module 84 may determine the probability and/or likelihood that signals are indicative of a water-present situation or some other situation, such as damaged electrodes 59, 62 and a blocked inlet 53. The water detection module 84 may create alarm signals when the detector 50 is tampered with, broken, or moved to a non-standard orientation.

The heartbeat module 85 is connected to the processing device 72 and communicates the status of the detector 50 to the utility through the communication device 74. In one example, the heartbeat module 85 processes a heartbeat signal every two to eight hours essentially broadcasting that the detector 50 is operational and operating normally.

The timer/sleep module 86 controls the sleep modes in order to minimize power supply 73 usage when the detector 50 is not in use. The timer/sleep module 86 is configured to wake different components discussed herein at set preprogrammed times. The timer/sleep module 86 may also be configured to wake up different components when specific circumstances are sensed by the detector 50 such as a large flow of water or damage to the detector 50.

It is also contemplated that the detector 50 may include other sensors such as pressure sensors, tilt sensors, and the like. One of ordinary skill in the art will recognize that additional sensors added to the detector will include corresponding circuitry similar to those components and/or modules described above and tailored to the additional sensors.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A fire hydrant monitoring system for a fire hydrant having a barrel including an open interior, the fire hydrant monitoring system comprising:
 a housing configured for connection to an exterior surface of the barrel and having a sensing chamber inlet in communication with the open interior of the barrel;
 a controller located in the housing; and
 at least one electrode connected to the controller and located in the sensing chamber;
 wherein when water enters the sensing chamber, the electrode detects the presence of water and the controller processes a signal.

2. The fire hydrant monitoring system of claim 1, wherein the sensing chamber is connected to the barrel of the fire hydrant by a mechanical connection.

3. The fire hydrant monitoring system of claim 2, wherein the mechanical connection is an inlet fitting having a screw thread connector.

4. The fire hydrant monitoring system of claim 1, wherein the controller further comprises a processing device and a communication device, the processing device configured to relay the signal to the communication device and the communication device configured to transmit the signal.

5. The fire hydrant monitoring system of claim 4, wherein the communication device is further configured as a transceiver.

6. The fire hydrant monitoring system of claim 4, wherein the controller is coupled to an antenna configured to transmit the signal from the communication device.

7. The fire hydrant monitoring system of claim 6, wherein the signal is transmitted to an intermediate base station before being transmitted to a utility.

8. The fire hydrant system of claim 6, wherein the signal is transmitted to an internet network.

9. The fire hydrant monitor system of claim 4, wherein the processing device is further configured to aggregate signals and relay the aggregated signals to the communication device periodically.

10. The fire hydrant monitor system of claim 9, wherein the processing device is further configured to store aggregated signals on a memory.

11. A detector for monitoring the presence of water in a fire hydrant comprising:
  a housing connected to the fire hydrant by an inlet fitting having a sensing chamber;
  a pair of electrodes, each electrode having a first end and second end, the first ends spaced from each other within the sensing chamber;
  a processing device connected to the pair of electrodes, wherein when the water is located within the sensing chamber between the two electrodes, the processing device processes a signal; and
  a communication device connected to the processing device to transmit the signal.

12. The detector of claim 11, wherein the inlet fitting includes screw threads.

13. The detector of claim 11, wherein the housing is located below a nozzle outlet of the fire hydrant.

14. The detector of claim 11, wherein the pair of electrodes is spaced from each other to form an open circuit, wherein when water is located within the sensing chamber between the two electrodes, the conductivity of the water forms a closed circuit.

15. The detector of claim 11, wherein the sensing chamber is in fluid communication with an open interior of the fire hydrant.

16. The detector of claim 11, wherein the signal is received by an intermediate base station before being transmitted to a utility.

17. The detector of claim 11, further comprising a power supply contained in the housing.

18. The detector of claim 16, wherein the signal is transmitted to a network.

19. The detector of claim 11, wherein the processing device is further configured to aggregate signals and relay the signals to the communication device periodically.

20. The detector of claim 18, wherein the processing device is further configured to store signals on a memory.

* * * * *